Oct. 2, 1928.
L. BONSIEUR
1,686,142
COMPOSITE MOLDED ARTICLE
Filed April 29, 1927
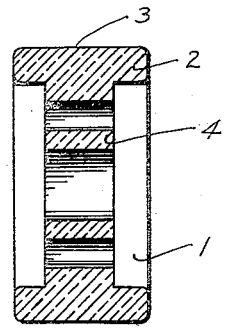
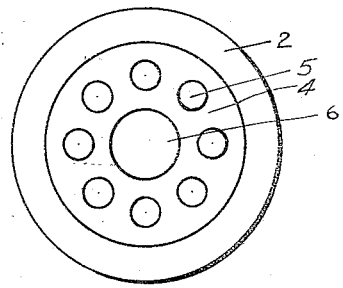
Fig. 2                    Fig. 4
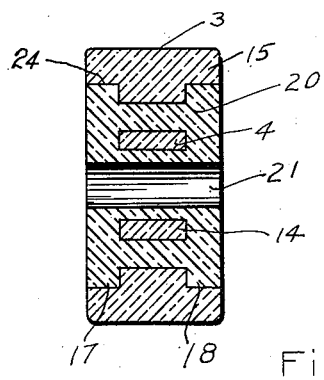
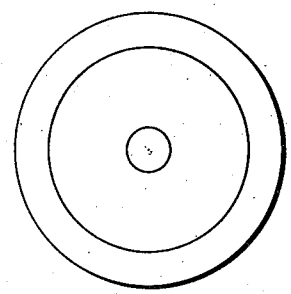
Fig. 1                    Fig. 3
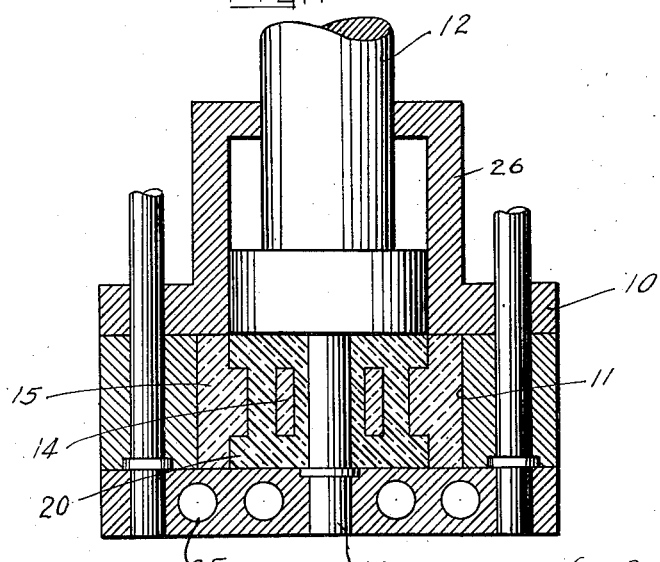
Fig. 5
Inventor
Le Bonsieur
By Frank L. Slough
His Attorney Patented Oct. 2, 1928.

1,686,142

UNITED STATES PATENT OFFICE.

LE BONSIEUR, OF ELYRIA, OHIO.

COMPOSITE MOLDED ARTICLE.

Application filed April 29, 1927. Serial No. 187,501.

My invention relates to wheels and relates particularly to wheels made of plastic molded materials which may be used for casters or the like.

Prior to my invention numerous attempts have been made to accomplish a design of wheel adaptable for such uses as those to which caster wheels are put and comprising an outer tire of rubber or rubber composition material rigidly secured to an inner hub portion of harder material capable of directly acting as a shaft bearing or capable of rigidly supporting a shaft bearing element. So far as I am aware such attempts have met with failure in various respects, chief among which is the failure to accomplish rigid connection between the hub portion of the wheel generally formed of molded phenol condensation products or the like, and the outer element comprising a rubber tire and which will endure during the severe conditions of use to which wheels of this type are often put.

An object, therefore, of my invention is to provide a wheel comprising an outer rubber tire portion and an inner hub portion wherein the tire portion will be fixedly secured to the inner portion.

Another object of my invention is to provide a structure of the above character wherein the inner portion may comprise a body of molded phenolic condensation products, or the like.

Another object of my invention is to provide a novel method of molding the rubber material to join it to the phenolic condensate in such a way that the rubber material will be held by the phenolic condensate forming a cage therefor under compression to resist separation of the two kinds of material.

Other objects of my invention and the invention itself will become apparent by reference to the following description of an embodiment of my invention, wherein Fig. 1 shows a transverse medial sectional view of a wheel embodying my invention;

Fig. 2 is a like view of the rubber portion only of such a wheel;

Figs. 3 and 4 are side elevational views of the structures illustrated sectionally in Figs. 1 and 2, respectively; and Fig. 5 is a medial sectional view illustrating the molding die with a plunger therefor, shown in elevation, and plastic materials, one of which is rubber, disposed within the die and being operated upon to mold the wheel shown in Figs. 1 and 3.

Referring now to the different figures of drawing, in all of which like parts are designated by like reference characters, my improved caster wheel preferably comprises an annular body 1, formed of a resilient vulcanized rubber molded in the shape of a disk wheel with the greatest thickness thereof adjacent its outer periphery and having an annular peripheral flange 2 which provides a resilient tire 3 projecting laterally of a web 4 of the body of rubber. The web is provided with a series of radially disposed apertures 5 and a relatively large centrally disposed axial bore 6. The annular body of resilient rubber is so formed prior to insertion into a mold, which mold is indicated generally at 10, that it may be securely joined with a hub frame 20 formed of a synthetic resin product or phenolic condensation product in a manner which will hereinafter be described in detail to produce a caster wheel as best shown in Fig. 1 of the drawings.

A caster wheel having a hub or central portion 20 of phenolic condensate and a resilient rubber tire 3 may be produced by placing the rubber wheel in the mold cavity 11 as indicated in Fig. 5 of the drawings, and is held in place therein by the plunger 26 and is compressed against the side walls of the cavity, with a filler rod 16, extending axially through the central aperture 6 of the web 4. The filler rod is of a diameter less than the diameter of the aperture 6 thereby permitting a clearance through which the bakelite may flow about when fused to the plastic state. A quantity of phenolic condensation material or a similar moldable synthetic resin product is placed within the mold in the granular or tablet form, within the confines of the annular flange 2 of the rubber wheel 1 and in a quantity which when fused to the plastic state will be greater than the area of the cavity 11 not occupied by the rubber body. When the plunger 12 is forced down and heat is applied to the mold through the heating coils 25, it will fuse the phenolic condensation material to the plastic state and force it through the recesses 5 of the rubber wheel web, between the filler rod and rubber and enclose the intermediate portions 14 and cause the intermediate portions 14 and 15 of the rubber wheel to be continuously compressed by the phenolic condensation product material when the wheel has been set and withdrawn from the mold in the hardened state.

The hardened plastic frame 20 when so molded together with the rubber body as indicated in Fig. 1, forms a caster wheel having a centrally disposed bore 21 to provide a bearing for a caster axle. The intermediate enclosed portions 14 of the rubber wheel are continuously compressed in the hardened plastic frame 20 and the partially enclosed portions 15 of the rubber body are continuously compressed between the annular flanges 17 and 18 of the frame 20 whereby the rubber is fixedly secured at its inner portions to the frame 20 overcoming any tendency of the two bodies to become separated. The resilient tire 3 of the rubber body is not compressed by the frame and is more resilient when the wheel has been formed as afore described than is the intermediate web portion 4 of the rubber body due to the fact that the tire portion is not compressed in the molded frame 20. The inner hub portion of the wheel being formed of a hardened synthetic resin material is capable of directly acting as a bearing for the axle about which the caster wheel revolves when applied to a caster yoke, this material is sufficiently hard to withstand wear between the axle and the hub when in use.

The tire 3 of rubber is sufficiently wide to cover the peripheries or felly portions 24 of the hard molded material 20 whereby a quite resilient caster wheel is produced, there being no hard material exposed which may contact with extraneous objects when the wheel is mounted on a caster yoke.

The temperature to which the mold is subjected to fuse the bakelite or the like material is not sufficient to re-vulcanize the previously vulcanized rubber wheel 1, so that resiliency of the rubber tire will not be impaired.

Any desired color of moldable material may be employed to produce a caster wheel having a tire rigidly secured to the molded hub portion flush with the side walls of the hub and presenting a caster wheel of neat appearance durable in construction and serviceable in use.

Having thus described my invention in a certain specific embodiment, I am aware that numerous and extensive departures may be made from the embodiment herein illustrated and described but without departing from the spirit of my invention.

I claim:

1. As an article of manufacture, a wheel comprising a frame of phenolic condensation product composition, or the like, and a body of rubber comprising a tire portion molded into the frame and held by portions thereof continually compressed by the confining frame portions.

2. As an article of manufacture, a body of rubber comprising a wheel tire held with inner portions confined in compressed condition by a molded phenolic composition or like frame.

3. As an article of manufacture, a molded frame of phenolic condensation product or the like, comprising a pair of centrally perforated end walls interconnected by a tubular axially disposed integral hub, and a plurality of webs extending between the end walls and integrally joining them together and a body of rubber molded upon the frame comprising rubber portions held between the frame webs and hub, and a wheel tire portion overlying the webs.

4. As an article of manufacture, a molded frame of phenolic condensation product or the like, comprising a pair of centrally perforated end walls interconnected by a tubular axially disposed integral hub, and a plurality of webs extending between the end walls and integrally joining them together and a body of rubber molded upon the frame comprising rubber portions held between the frame webs and hub, a wheel tire portion overlying the webs and end walls.

5. The method of forming a wheel comprising first molding a rubber wheel having an axial opening and a laterally extending rim, and a rim supporting ring with transverse openings extending through it, and then in placing the rubber wheel in a mold cavity and molding a body of phenolic condensate product material in the cavity forcing it under the influence of heat and pressure to fill the spaces provided by said transverse openings.

6. The method of forming a wheel comprising first molding a rubber wheel having an axial opening and a laterally extending rim, and a rim supporting ring with transverse openings extending through it, and then in placing the rubber wheel in a mold cavity and molding a body of phenolic condensate product material in the cavity forcing it under the influence of heat and pressure to fill the spaces provided by said transverse openings, and at the same time disposing a mold die rod element of smaller diameter than the said axial opening axially within the opening and filling the space between the rod and the walls of the axial opening with such molded material.

7. The process of forming a composite wheel having a rubber tire and harder inner wheel portions, comprising the subjecting phenolic condensation material or the like to the effects of heat and great pressure in a mold cavity into which there has been previously placed a rubber wheel having transverse openings therethrough.

8. As an article of manufacture, a frame of molded phenolic composition material, and a body of rubber partially confined in compressed condition by embracing integral portions of the frame.

9. The process of forming a composite molded article comprising a relatively hard supporting frame and a body of rubber secured therein in compressed condition, comprising the subjecting of the rubber embraced by the phenolic condensate material simultaneously to the effect of heat and of great pressure in a mold cavity.

In testimony whereof I hereunto affix my signature, this 8th day of April, 1927.

LE BONSIEUR.